United States Patent
Kroning et al.

(10) Patent No.: US 8,248,293 B2
(45) Date of Patent: Aug. 21, 2012

(54) METHOD AND DEVICE FOR THE SPATIALLY RESOLVED DETECTION AND RECONSTRUCTION OF OBJECTS BY MEANS OF MICROWAVES

(75) Inventors: Michael Kroning, Saarbrucken (DE); Andrey Bulavinov, Saarbrucken (DE); Roman Pinchuk, Saarbrucken (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 12/743,396

(22) PCT Filed: Sep. 20, 2008

(86) PCT No.: PCT/DE2008/001567
§ 371 (c)(1),
(2), (4) Date: Nov. 15, 2010

(87) PCT Pub. No.: WO2009/065369
PCT Pub. Date: May 28, 2009

(65) Prior Publication Data
US 2011/0050480 A1 Mar. 3, 2011

(30) Foreign Application Priority Data
Nov. 19, 2007 (DE) .......................... 10 2007 055 217

(51) Int. Cl.
*G01S 13/00* (2006.01)

(52) U.S. Cl. ............................ 342/27; 342/118; 342/179
(58) Field of Classification Search ................... 342/27, 342/118, 179
See application file for complete search history.

(56) References Cited

U.S. PATENT DOCUMENTS

| 6,777,684 | B1 | 8/2004 | Volkov et al. |
| 6,839,471 | B1 * | 1/2005 | Vogt, IV .................... 382/280 |
| 6,927,691 | B2 | 8/2005 | Yukl |
| 7,034,746 | B1 | 4/2006 | McMakin et al. |
| 2004/0090359 | A1 | 5/2004 | McMakin et al. |
| 2005/0232459 | A1 * | 10/2005 | Rowe et al. .................. 382/100 |
| 2007/0109180 | A1 | 5/2007 | Charpentier et al. |
| 2007/0132631 | A1 * | 6/2007 | Henson et al. ............. 342/25 R |
| 2007/0222661 | A1 * | 9/2007 | Stagliano et al. .......... 342/26 R |
| 2009/0058710 | A1 * | 3/2009 | Levitan et al. ................. 342/22 |

FOREIGN PATENT DOCUMENTS
EP 0 703 447 A2 3/1996
* cited by examiner

*Primary Examiner* — Timothy A Brainard
(74) *Attorney, Agent, or Firm* — Antonelli, Terry, Stout & Kraus, LLP.

(57) ABSTRACT

A method and a device for the spatially resolved detection and reconstruction of objects using microwaves is described, in which at least one object to be detected is subjected to microwaves that are generated by a plurality of microwave antennas and microwave fractions reflected by the object are detected and converted into microwave signals that can be analyzed, based on which an analysis for the spatially resolved object detection is carried out.

22 Claims, 8 Drawing Sheets

| $A_{1H,1V}$ | $A_{1H,2V}$ | $A_{1H,3V}$ | $A_{1H,4V}$ | $A_{1H,5V}$ | $A_{1H,6V}$ | $A_{1H,7V}$ | $A_{1H,8V}$ | $A_{1H,9V}$ | $A_{1H,10V}$ | $A_{1H,11V}$ | $A_{1H,12V}$ |
|---|---|---|---|---|---|---|---|---|---|---|---|
| $A_{2H,1V}$ | $A_{2H,2V}$ | $A_{2H,3V}$ | $A_{2H,4V}$ | $A_{2H,5V}$ | $A_{2H,6V}$ | $A_{2H,7V}$ | $A_{2H,8V}$ | $A_{2H,9V}$ | $A_{2H,10V}$ | $A_{2H,11V}$ | $A_{2H,12V}$ |
| $A_{3H,1V}$ | $A_{3H,2V}$ | $A_{3H,3V}$ | $A_{3H,4V}$ | $A_{3H,5V}$ | $A_{3H,6V}$ | $A_{3H,7V}$ | $A_{3H,8V}$ | $A_{3H,9V}$ | $A_{3H,10V}$ | $A_{3H,11V}$ | $A_{3H,12V}$ |
| $A_{4H,1V}$ | $A_{4H,2V}$ | $A_{4H,3V}$ | $A_{4H,4V}$ | $A_{4H,5V}$ | $A_{4H,6V}$ | $A_{4H,7V}$ | $A_{4H,8V}$ | $A_{4H,9V}$ | $A_{4H,10V}$ | $A_{4H,11V}$ | $A_{4H,12V}$ |
| $A_{5H,1V}$ | $A_{5H,2V}$ | $A_{5H,3V}$ | $A_{5H,HV}$ | $A_{5H,5V}$ | $A_{5H,6V}$ | $A_{5H,7V}$ | $A_{5H,8V}$ | $A_{5H,9V}$ | $A_{5H,10V}$ | $A_{5H,11V}$ | $A_{5H,12V}$ |
| $A_{6H,1V}$ | $A_{6H,2V}$ | $A_{6H,3V}$ | $A_{6H,4V}$ | $A_{6H,5V}$ | $A_{6H,6V}$ | $A_{6H,7V}$ | $A_{6H,8V}$ | $A_{6H,9V}$ | $A_{6H,10V}$ | $A_{6H,11V}$ | $A_{6H,12V}$ |
| $A_{7H,1V}$ | $A_{7H,2V}$ | $A_{7H,3V}$ | $A_{7H,4V}$ | $A_{7H,5V}$ | $A_{7H,6V}$ | $A_{7H,7V}$ | $A_{7H,8V}$ | $A_{7H,9V}$ | $A_{7H,10V}$ | $A_{7H,11V}$ | $A_{7H,12V}$ |
| $A_{8H,1V}$ | $A_{8H,2V}$ | $A_{8H,3V}$ | $A_{8H,4V}$ | $A_{8H,5V}$ | $A_{8H,6V}$ | $A_{8H,7V}$ | $A_{8H,8V}$ | $A_{8H,9V}$ | $A_{8H,10V}$ | $A_{8H,11V}$ | $A_{8H,12V}$ |
| $A_{9H,1V}$ | $A_{9H,2V}$ | $A_{9H,3V}$ | $A_{9H,4V}$ | $A_{9H,5V}$ | $A_{9H,6V}$ | $A_{9H,7V}$ | $A_{9H,8V}$ | $A_{9H,9V}$ | $A_{9H,10V}$ | $A_{9H,11V}$ | $A_{9H,12V}$ |
| $A_{10H,1V}$ | $A_{10H,2V}$ | $A_{10H,3V}$ | $A_{10H,4V}$ | $A_{10H,5V}$ | $A_{10H,6V}$ | $A_{10H,7V}$ | $A_{10H,8V}$ | $A_{10H,9V}$ | $A_{10H,10V}$ | $A_{10H,11V}$ | $A_{10H,12V}$ |
| $A_{11H,1V}$ | $A_{11H,2V}$ | $A_{11H,3V}$ | $A_{11H,4V}$ | $A_{11H,5V}$ | $A_{11H,6V}$ | $A_{11H,7V}$ | $A_{11H,8V}$ | $A_{11H,9V}$ | $A_{11H,10V}$ | $A_{11H,11V}$ | $A_{11H,12V}$ |
| $A_{12H,1V}$ | $A_{12H,2V}$ | $A_{12H,3V}$ | $A_{12H,4V}$ | $A_{12H,5V}$ | $A_{12H,6V}$ | $A_{12H,7V}$ | $A_{12H,8V}$ | $A_{12H,9V}$ | $A_{12H,10V}$ | $A_{12H,11V}$ | $A_{12H,12V}$ |

$$f_{zf} = \frac{2 d \Delta f}{c \Delta T}$$

METHOD AND DEVICE FOR THE SPATIALLY RESOLVED DETECTION AND RECONSTRUCTION OF OBJECTS BY MEANS OF MICROWAVES

BACKGROUND OF THE INVENTION

1. Field of the Invention

The invention relates to a method and a device for the spatially resolved detection and reconstruction of objects by means of microwaves. In this context, at least one object to be detected is subjected to microwaves that are generated by a plurality of microwave antennas and at least fractions thereof are reflected by the object. These reflected microwave fractions are detected and converted into microwave signals that can be analyzed, based on which analysis for the spatially resolved object detection is carried out. An analysis technique of this kind is very suitable for security examinations, for example of people at border crossings. For example, it is possible to use this microwave technique to screen persons for hidden objects such as weapons, explosives and other such materials.

2. Description of the Prior Art

In today's globally interconnected world, security considerations are becoming more and more important. The most widely employed security systems for examining items of luggage, cargo or people, such as are used for example in airports and railway stations, rely on X-rays to detect dangerous objects and substances. Examinations of this kind are typically based on the simple principle of radiation, in which materials of different density are differentiated according to their individual contrast characteristic in the X-ray projection image.

An alternative method uses electromagnetic waves in the microwave range, that is to say electromagnetic waves in the frequency range from 300 MHz to 200 GHz. In this context, microwave fields strike an object, substance or person to be examined, that is to say any object, and are reflected back differently depending on the nature of the object. Unfortunately, the resolution capability of a conventional microwave method is limited by its relatively long wavelength, but this drawback may be overcome by the use of tomographic measurement and reconstruction principles, which also enable objects to be reconstructed with a spatial resolution that under certain circumstances may even extend beyond the wavelength boundary.

The advantages of such a microwave method, abbreviated to MW-method, compared to the widely used X-ray method, are obvious. On the one hand, ionizing radiation is used, on the other hand, with the imaging-forming object reconstruction provided by tomographic analysis techniques it is possible to obtain spatial information about the objects being examined.

Previously known and commercially available MW systems normally use arrays of sensors to scan the objects, which are attached to a moving gantry. Scanning creates a synthetic aperture that enables spatial focusing in the volume.

However, apparatuses of this kind are extremely complex in mechanical terms, and expensive to build. The examination also takes a long time, so the practical utility of such systems, particularly in examination areas with high traffic rates, such as airport security check lines, are in need of improvement. In addition, the object must remain motionless during the screening, a condition that is practically impossible, or at least very difficult to achieve, particularly when people are being examined.

A method and device for measuring multiphase flows in tubes are disclosed in EP 0 703447 A2. In this context, the distributions of permittivity and conductivity relative to the tubular cross-section are detected via a plurality of microwave antennas arranged around the tube.

A method for dielectric scanning of a person is known from U.S. Pat. No. 6,927,691 B2. In this context, the person is radiated with electromagnetic radiation at a frequency of 5.5 GHz. Anomalies such as caused, for example, by weapons or contraband may be detected and displayed by comparison of the captured values with an expected dielectric response.

Surveillance systems based on a holographic reconstruction of an examined object are known from US Publications 2004/0090359 A1 and US 2005/0232459.

SUMMARY OF THE INVENTION

The invention is refinement of a method and a device for the spatially resolved detection and reconstruction of objects with microwaves, in which at least one object to be detected is subjected to microwaves that are generated by a plurality of microwave antennas and fractions of the microwaves reflected by the object are detected and converted into microwave signals that can be analyzed, based on which an analysis for the spatially resolved object detection is carried out, to provide an improvement in the accuracy of the analysis by which an object may be determined both in terms a material or representational object determination and in terms of a spatial location, and at the same time lower construction and cost-related effort is provided than with previously known MW methods.

The method according to the invention for spatially resolved detection and reconstruction of objects with microwaves which are generated and detected as follows:

First, n microwave antenna units are arranged in a spatial distribution about the object to be detected, for example, on a three-dimensional frame on which the individual microwave antenna units are fixed spatially at a defined distance from each other. The distance between any two directly adjacent microwave antenna units should be greater, in fact much greater, than the wavelength of the microwaves that are generated by the microwave antenna units. The spatial arrangement of the individual microwave antenna units is carried out with due consideration for the directionality of the individual microwave antenna units, and should be carried out in such way that the totality of a body or object to be examined may be detected at least with a composite view of the directionalities of all microwave antenna units. The number and spatial distribution of the microwave antenna units is to be selected according to the size and shape of the objects that are to be examined.

In a first measuring cycle, a first microwave antenna unit is selected and actuated to transmit microwaves at a frequency between 10 and 200 GHz. At least some of the microwaves striking the object to be examined are reflected back and received by m microwave antenna unit, where m$\leq$n, and preferably m=n. All microwave antenna units which are present to receive the microwaves transmitted from the first microwave antenna unit that are reflected from or deflected by the object to be examined. The received microwaves are converted into corresponding microwave signals, which are then initially stored in a temporary or permanent storage medium. Then, another microwave antenna unit is selected and activated to transmit microwaves. The detection of microwaves which are reflected or deflected by the object and their conversion into microwave signals are preferably carried out by all of the microwave antenna units, and the microwave signals are initially stored for subsequent analysis.

The preceding process with regard to the transmission of microwaves by a single selected microwave antenna unit and reception of the microwaves reflected from an object by all of the microwave antenna units and storage of the microwave signals generated therefrom is repeated cyclically with all microwave antenna units serving as the transmission source. Finally, on the basis of all of the microwave signals which are obtained and stored in this way, the object is reconstructed using a suitable reconstruction algorithm.

In order for the preceding method to work, the microwave antenna units must be capable of both transmitting and receiving microwaves. Particularly advantageously, each individual microwave antenna unit is equipped with two antennas, which differ from one another in their polarization properties. Each of the two antennas is able to both transmit and receive microwaves. It has been found that it is possible to achieve a marked improvement in the information density and thus also in the reliability of object interpretations of an object to be detected if microwaves are transmitted with opposite polarizations by each of the two antennas of a microwave antenna unit during the sequential activation cycle, and microwaves are received and stored correspondingly by both antennas of all microwave antenna units.

In a preferred embodiment, the two antennas of each microwave antenna unit are polarized horizontally and vertically, and are thus able to transmit vertically and horizontally polarized microwaves and also to detect microwaves on a vertical and horizontal polarization plane. For a measurement cycle, for example, vertically polarized microwaves are transmitted first in temporal sequence, and these microwaves are received by all microwave antenna units via both the vertically and the horizontally polarized antennas. This is followed by the transmission of horizontally polarized microwaves, which are also received by all antennas of all microwave antenna units. It is unimportant whether the transmission of vertically and horizontally polarized microwaves from a given microwave antenna unit takes place in temporal sequence or simultaneously.

The use of different polarizations thus generates a quadruple volume of information, since the following polarization combinations are created for each microwave antenna unit: H×H, H×V, V×H, V×V, where "H" stands for horizontally polarized and "V" stands for vertically polarized. This enables the quality of object reconstructions, for example in the form of microwave images, to be improved considerably.

The following is a detailed description of the microwave signal analysis in accordance with the invention with reference to the diagrams and figures shown in the drawings.

In order to implement the microwave measurement method of the invention as described in the aforegoing, it is necessary to create a device with the following features: a plurality n of microwave antenna units is arranged in a spatial pattern about an object to be detected, of which each microwave antenna unit is equipped with two transmitting/receiving antennas having opposite polarizations. Frequency-modulated microwaves at frequencies between 10 and 200 GHz may be transmitted and received by means of the microwave antenna units. A control unit is provided to control the activation of the n microwave antenna units in a temporal sequence, wherein an HF generator unit is connected to the n microwave antenna units to provide the HF power necessary for transmitting microwaves. A collection unit is connected to the n microwave antenna units for analyzing the microwave signals, and the microwave signals which are generated by each microwave antenna unit are stored here initially and then analyzed in a reconstruction module. Finally, the calculated results are displayed visually on an output unit which is preferably a monitor.

The n microwave antenna units are arranged spatially, for example in a fixed framework, preferably such that all antenna units are equidistant from the closest adjacent microwave antenna units. The distance between adjacent microwave antenna units is greater than the wavelength of the microwave, and preferably is greater than 10 cm, so that the number of microwave antenna units and the data volume associated therewith may be kept to manageable proportions. Further features that advantageously characterize the device will be explained in greater detail with reference to the following figures.

BRIEF DESCRIPTION OF THE DRAWINGS

In the following, the invention will be described for exemplary purposes without limitation of the general inventive idea on the basis of embodiments thereof and with reference to the drawings. In the drawings.

DETAILED DESCRIPTION OF THE INVENTION

Figure 1:
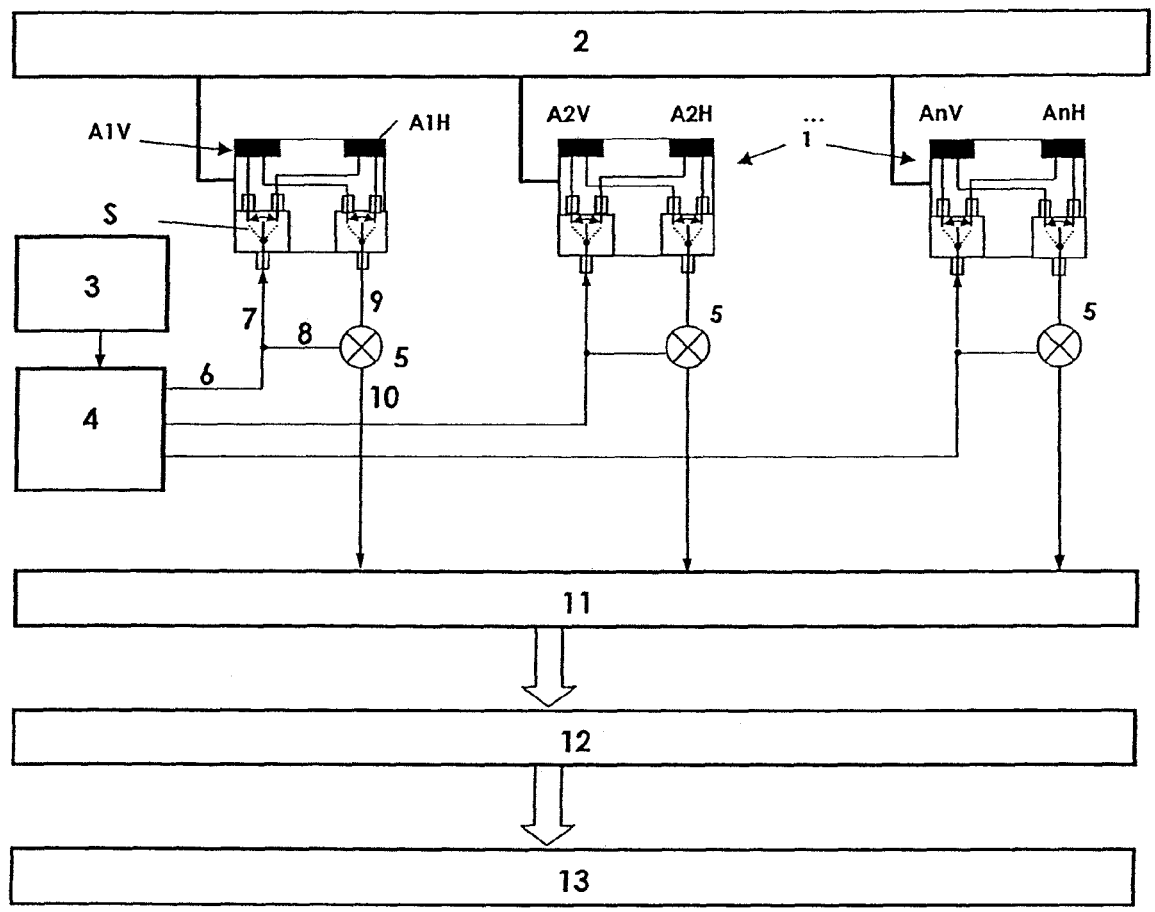
FIG. 1 is a schematic representation of the device according to the invention.

FIG. 1 shows one possible configuration of an embodiment of a microwave antenna unit that enables improved object capture and detection. The embodiment is based on a novel measurement approach using a sequentially actuated transmitter array with a distributed aperture in combination with switching individual antennas to enable time signals to be measured more quickly and more accurately, and special signal processing and image reconstruction technique.

The microwave antenna arrangement essentially has the following modules:

A plurality n of individual microwave antenna units 1, each having two transmitter/receiver antennas. The two antennas have opposite polarization to each other which is preferably a horizontal and a vertical polarization. In the following, reference characters AiH and AiV where i=1 . . . n will be used. A control unit 2 assures temporal control and switching of the individual antennas AiV, AiH from transmit to receive mode. Switches S are provided on each antenna AiH and AiV specifically in order to assure switching. An HF generator 3 provides the HF energy necessary for generating microwaves, wherein the transmission signal output by HF generator 3 for activating the individual antennas AiV, AiH is frequency modulated and is amplified and routed to the respective transmitter antennas AiV, AiH by a power divider 4.

The microwaves are detected by the individual antenna units AiV, AiH which function as receiving antennas. The detected microwaves are converted to analog microwave signals and before digitization, they are combined with the transmission signal, which functions as the reference signal, in a mixer 5. At this point, it should be noted that waveguide sections 6 and 8 and 7, 9 and 10, which are designed for lossless transmission of HF signals, are the same length as each other, which is extremely important for temporal tuning when mixing signals.

A multichannel electronic data collection device 11 assures analog to digital conversion of the mixed microwave signals and storage of the signals for subsequent data analysis in a reconstruction module 12, which operates on the basis of parallel computer structures and enables image reconstruction of a detected object under realtime conditions with 3D imaging capability. Finally, the results of analysis are displayed via a display unit 13.

While the device shown in FIG. 1 is operating, one antenna unit 1 per measurement cycle is always used as the transmitter, and all n antenna units 1 record the received signals throughout the entire transmission operation. Temporal control of the transmission operations of various antenna units 1 is assured by control unit 2. Each antenna unit 1 is active as the transmitter in two transmission cycles for each measurement cycle, so that electromagnetic waves with opposite polarizations (horizontal H and vertical V) are radiated. The collected microwave signals are stored in the form of time signals, and after all antenna units have been activated, the volume of signal data collected is 4×N×N, as is shown in greater detail in FIG. 2.

Figure 2A:
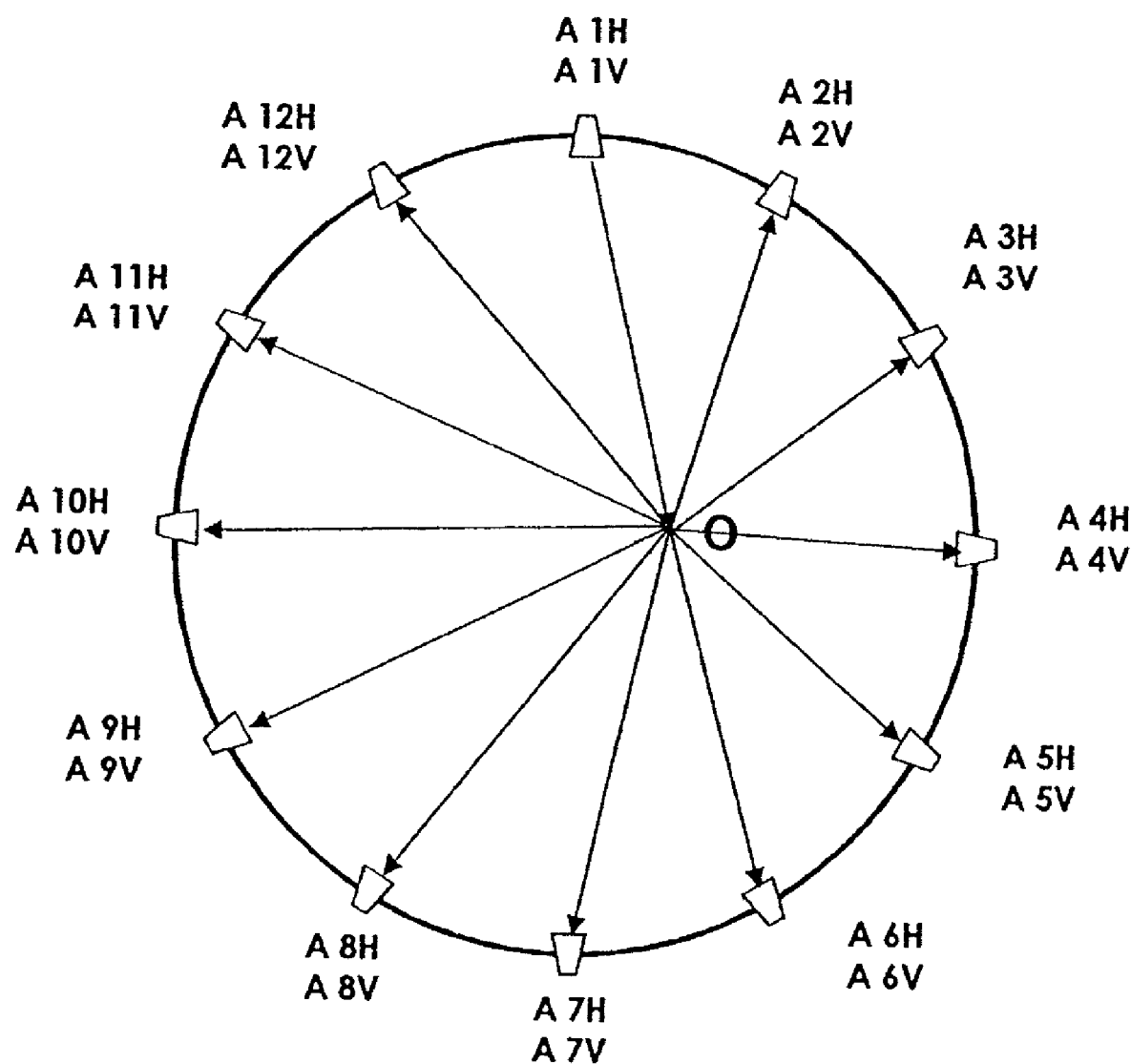
FIGS. 2a)-2e) show microwave signals obtained on the basis of information matrices.
Figure 2B:
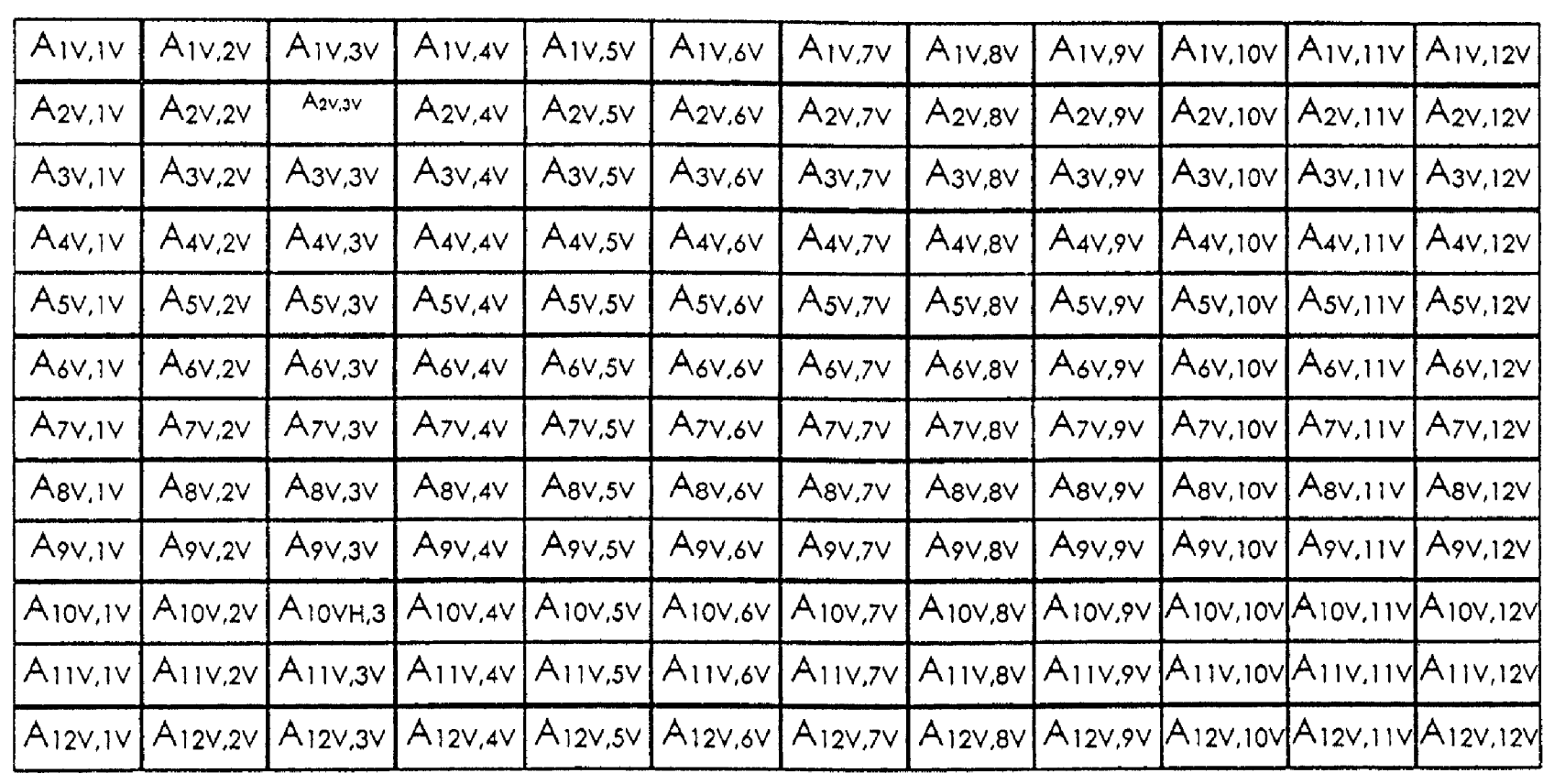
Figure 2C:
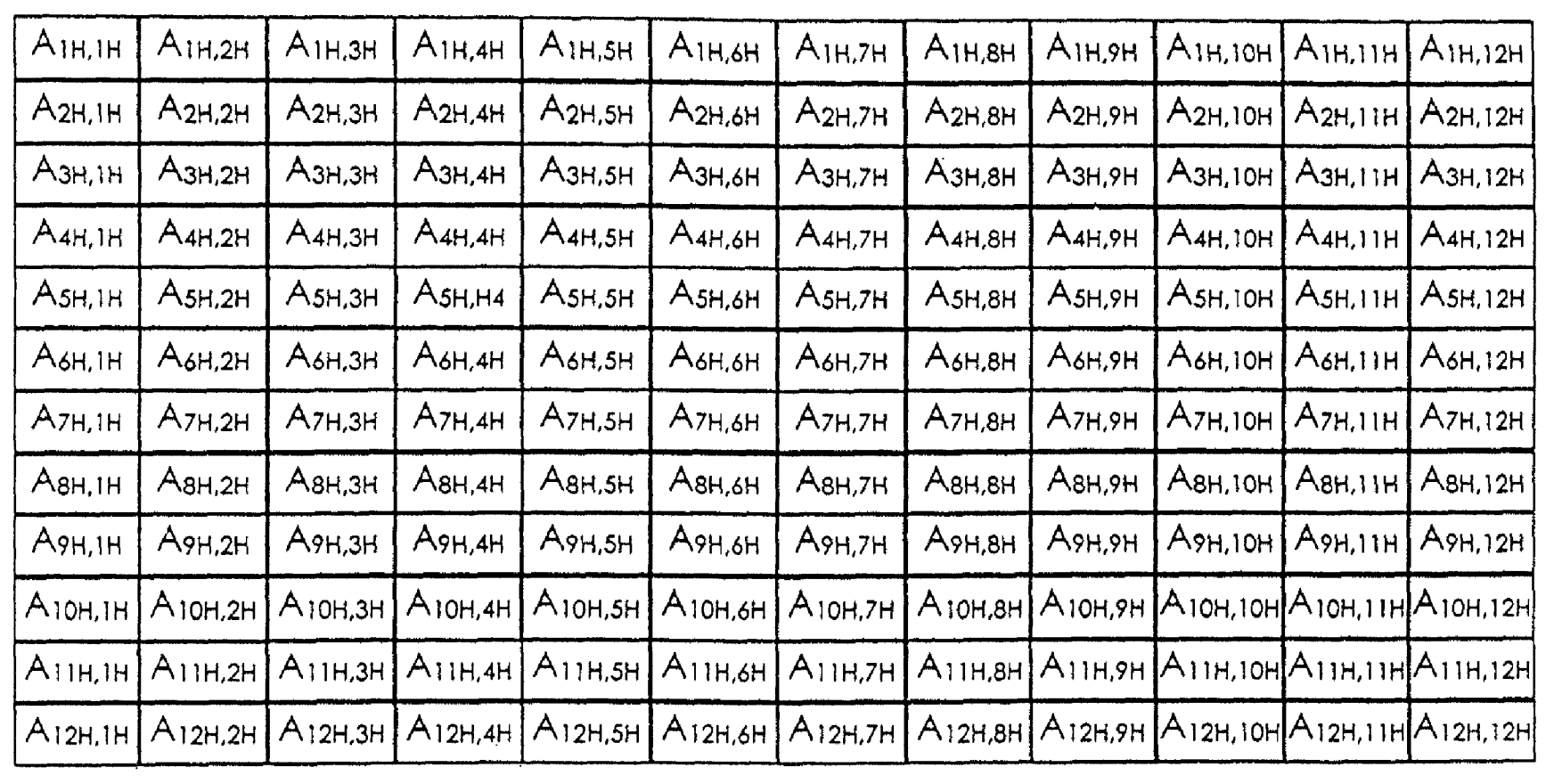
Figure 2E:
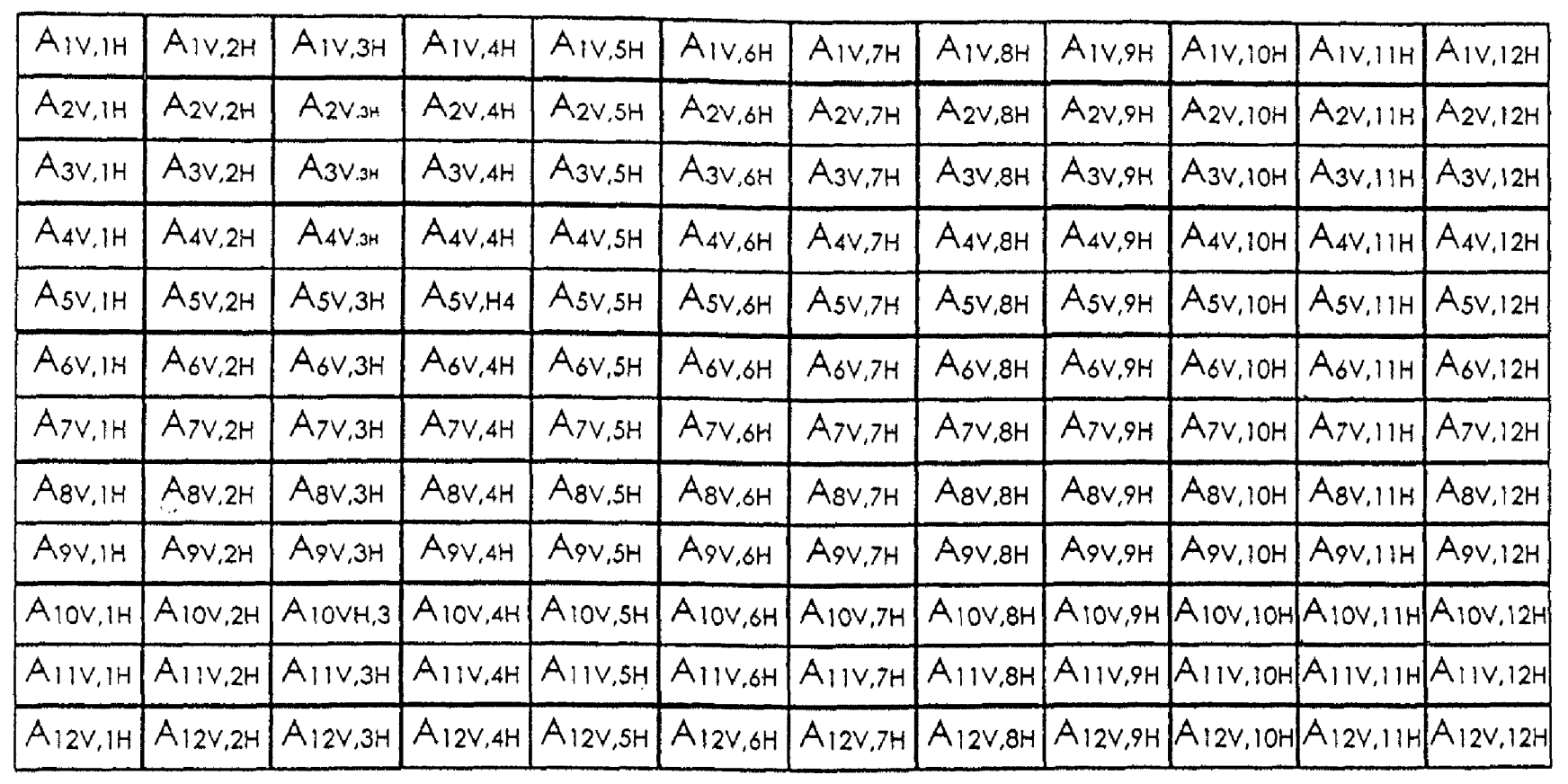

For the purposes of FIG. 2$a$), (it will be assumed that n=12) antenna units 1 are arranged about an object to be detected. In this case, each individual antenna unit 1 has two transmit/receive antennas with horizontal AiH and vertical AiV polarization, where i=1, ... 12. FIG. 2$a$) illustrates the principle of measurement on the basis of a 2-dimensional sectional plane, though this example may be extended to 3 dimensions.

During a measurement cycle, all antennas are "cycled through" one after the other, such that the data matrices shown in FIGS. 2$b$) to 2$e$) are completely filled with received microwave signals as follows:

The content of each data matrix is to be interpreted as follows: each element of a matrix A has two indices, each of which has a number and a letter, V or H. The first index corresponds to the respective transmitting antenna and the second corresponds to the respective receiving antenna. V or H corresponds to the polarization used then transmitting or receiving. Using different polarizations yields a fourfold volume of information, because the following polarization combinations are obtained for each transmitter/receiver pair: H×H, H×V, V×H, V×V. As a result, the quality of MW images is significantly improved.

For example, in the case of 2$b$), the data matrix represents the case in which the microwaves were transmitted with vertical polarization and were received with the vertically polarized receiver antennas. Thus for example, matrix value "A12V6V" represents a measurement signal that is obtained by transmitting from antenna 12 in the form of vertically polarized microwaves and receiving by antenna 6, which is also in vertical polarization.

The data matrix in FIG. 2$c$) represents the case in which the transmitter polarization is horizontal and the receiver polarization is horizontal. The data matrix in FIG. 2$d$) represents the case in which the transmitter polarization is horizontal and the receiver polarization is vertical. The data matrix in FIG. 2$e$) represents the case in which the transmitter polarization is vertical and the receiver polarization is horizontal.

Figure 3:
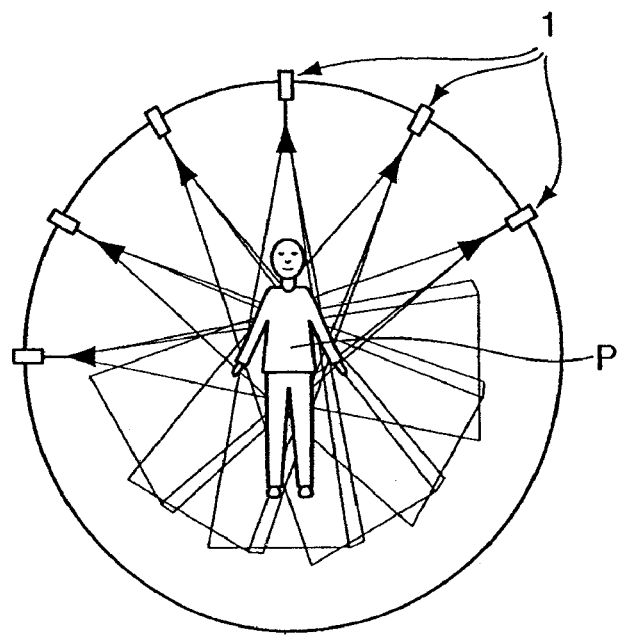
FIG. 3 is an illustration of a spatial arrangement of microwave antenna units for examining people.

FIG. 3 shows a measurement configuration for detecting a person P using microwave antenna units 1 arranged spatially about the person. In the arrangement as shown, MW antennas 1 are located three-dimensionally in a space, for example installed permanently on or in a chamber. For the sake of simplicity, in the illustration this arrangement is only shown schematically as a 2D cross-sectional image. The directionality of MW antennas 1 and their spatial arrangement are designed such that the area to be reconstructed is covered completely in a composite image by the directionalities of all MW antennas 1.

A particularly noteworthy feature of the invention compared with known MW systems relates to the arrangement of MW antennas in space about the object to be examined, with the greatest possible distances between the individual MW antennas 1. The number of MW antennas 1 should also be kept as low as possible, in order to reduce volume of data to be processed as far as possible. This distance between two adjacent MW antennas 1 may be significantly larger than the wavelength of the microwaves that are radiated from the individual MW antennas 1, thus deliberately violating the "sampling" theorem. This is made possible by a suitable synthetic focus on each pixel and point in space, so that nuisance diffraction phenomena of a distributed aperture are suppressed. This reconstruction principle will be explained in the following.

In order to enable the data from the received microwave signals to be analyzed meaningfully, besides the accumulation of data described above, the measurement signals must also be pretreated appropriately, in the following manner.

Figure 4:
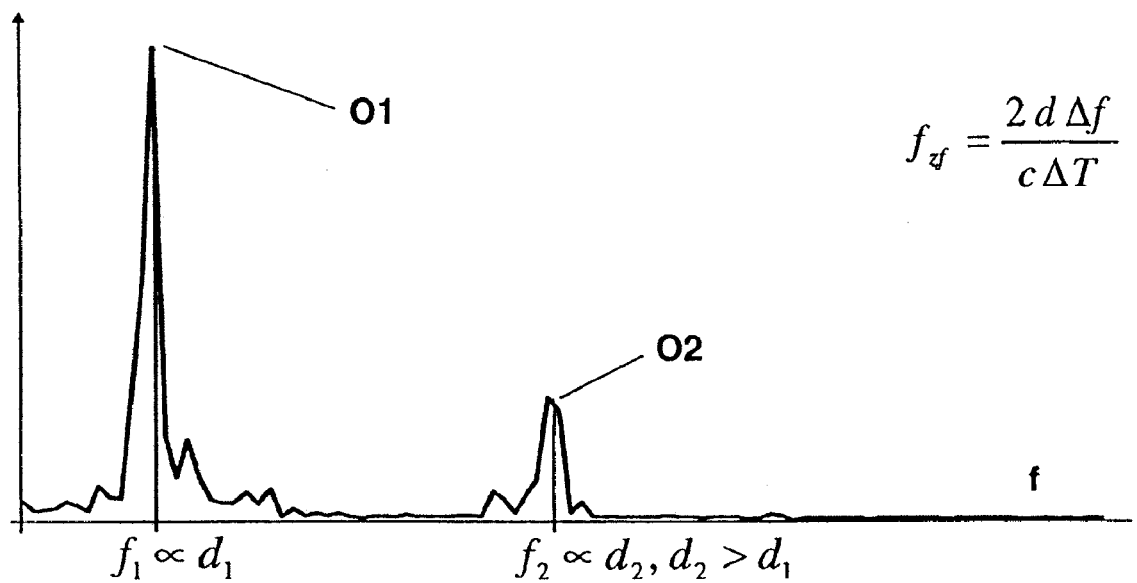
FIG. 4 shows a microwave signal in the frequency domain.

The measurement signals are first stored as time signals, that is to say their amplitude values are plotted along the time axis. The case is considered in which the same antenna functions as transmitter and receiver. Frequency-modulated signals in the GHz range, that is to say frequencies from 10 to 200 GHz are radiated depending on the application. If two objects are at different distances from the antenna, at least a fraction of the radiated wave will be reflected back from these objects and received at the site of the antenna. If the returning signal is mixed with the reference signal, that is to say the transmission signal, a new signal is created in the form of a sum signal. If this signal is represented in the frequency domain, the objects situated as different distances are represented by different frequency values, as may be seen in the diagrammatic representation of FIG. 4. In this case, frequency values f of a received microwave signal are plotted along the x-axis and amplitude values A are plotted on the y-axis. It may be seen from this frequency representation that the frequency peak at frequency f1 originates from an object 1, which is located closer to the receiver antenna than object 2, which is represented by the frequency peak at frequency f2, where f2>f1. Thus, the respective "frequency coordinates" in the stored sum signals are directly proportional to the distance from the antenna of an object serving as a reflector for the microwaves. In this way, the objects may be located directly. The same applies if the positions of the transmitter and the receiver are not identical. This enables both 2- and 3-dimensional images to be reconstructed.

Figure 5:
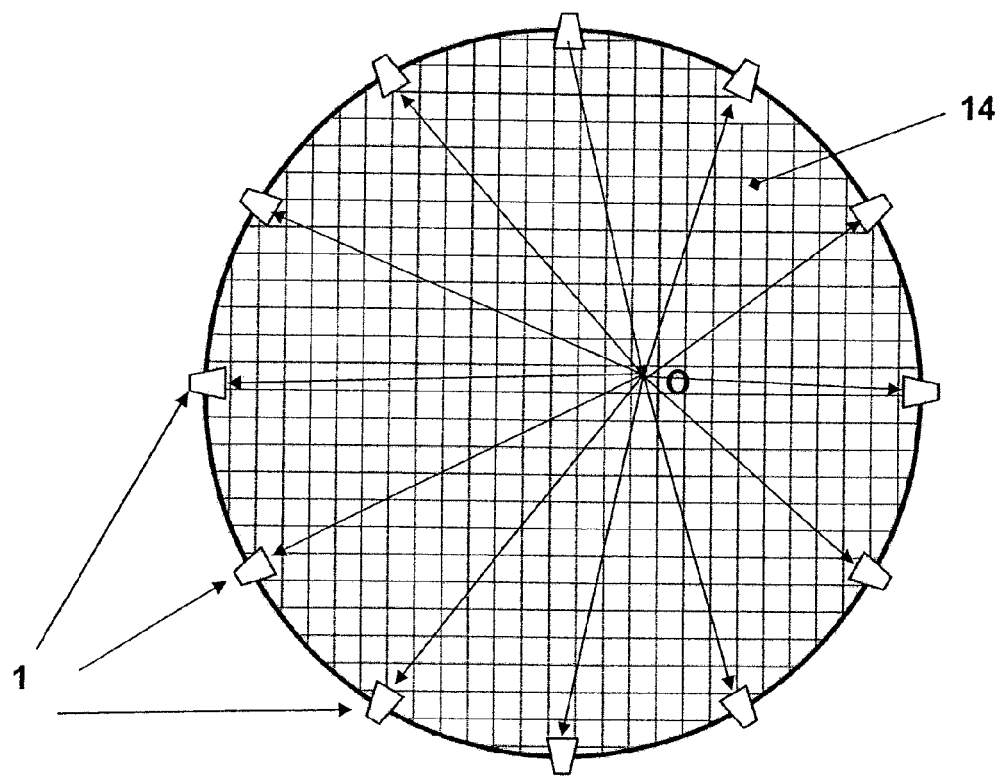
FIG. 5 shows the calculation principle for a "look-up table"

The reconstruction principle will be explained in greater detail in the following, with reference to FIG. 5 and using a 2D figure, wherein the 2D case may easily be expanded to a 3D reconstruction.

The reconstruction zone, in this case a circular zone, is divided into small spatial clusters or unit spatial zones, wherein the dimensions of the clusters should typically be selected according to the maximum possible physical resolution, that is to say as a function of the working frequency. A "look-up table" containing the distances from each antenna 1 to each unit spatial zone, also called a voxel 14, within the reconstruction zone, is calculated before the actual reconstruction. N values are stored for each voxel 14 of the reconstruction zone, corresponding to the spatial distance between each of the n antennas 1 and the voxel 14. Wavepaths for all combinations of transmitters and receivers can be calculated by combining these values appropriately.

The reconstruction is now performed on the basis of the "look-up tables" that have been created in this way. The stored signal values are added together spatially according to the tomographical principle, taking into account the paths, so that the signal maxima of various signals are superimposed on each other in corresponding voxels. Thus, by using "look-up tables" it is possible to dispense with time-consuming, repetitive calculations of paths during the reconstruction, and the reconstruction calculation is reduced to simply adding amplitude values. This is particularly helpful when reconstruction modules with parallel computer structures since these enable particularly effective distribution of addition operations.

The reconstruction outlined in the preceding is carried out in the corresponding reconstruction module as shown in the image in FIG. 1, preferably using parallel computing structures, which enables real-time calculation of 3-dimensional images even of moving objects. Finally, these images are displayed on a visualization unit which may be, for example, a monitor unit.

Figure 6:
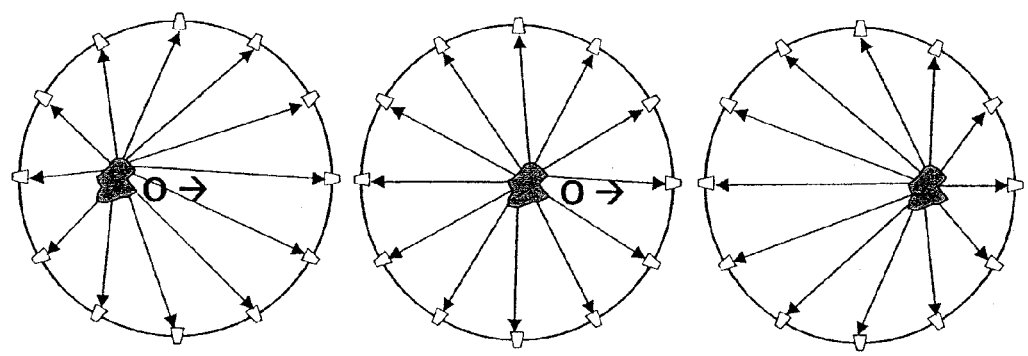
FIG. 6 shows an example of use of an object movement during an object examination.

A further advantageous refinement of the invention is designed to improve image reconstruction or increase the data content of the microwave method with distributed apertures, and relates to the use of object motion for the purposes of its scanning according to the image represented in FIG. 6. If an object 0 moves in a spatial zone that is collected by antennas 1, for example from right to left according to the three sequence images in FIG. 6, object 0 is located at regular intervals via microwaves. The results of reconstruction of the object image are superimposed in various time points, so that the image quality is improved with each iteration.

LEGEND

1 MW antenna units
2 Control unit
3 Generator
4 Power divider
5 Mixer
6 and 7 Waveguide
8 and 9 Waveguide
10 Waveguide
11 Electronic multichannel data collection device
12 Reconstruction module with parallel computing structures
13 Visualization unit
14 Voxel

The invention claimed is:

1. A method for spatially resolved detection and reconstruction of at least one objects with microwaves, in which the at least one object to be detected is subjected to microwaves that are generated by a plurality n of microwave antennas and fractions of microwaves reflected by the at least one object are detected and converted into microwave signals that can be analyzed, based on which an analysis for the spatially resolved detection of the at least one objects is carried out, comprising:
   a) providing n microwave antennas in a spatial distribution about the at least one object to be detected, in which a distance between each microwave antenna and a respective adjacent microwave antenna is greater than wavelengths of the microwaves and is spaced apart at least 10 cm;
   b) selecting and activating a first microwave antenna for transmitting frequency-modulated microwaves at frequencies from 10 to 200 GHz;
   c) receiving the microwaves reflected from the at least one object with m microwave antenna units, where m≦n, by generating microwave signals;
   d) storing values of the microwave signals;
   e) selecting and activating another microwave antenna for transmitting microwaves and carrying out steps c) and d);
   f) carrying out step e) repeatedly, with selection of another microwave antenna which is not the same antenna as any microwave antennas that have been selected previously; and
   g) defining a reconstruction zone in which the at least one object to be reconstructed contains a plurality of voxels, calculating and storing distances from each antenna to each voxel, and after all microwave antennas have been activated, performing a reconstruction of the at least one object with a reconstruction algorithm utilizing the plurality of voxels during processing of the stored microwave signals and the stored distances.

2. The method as recited in claim 1, wherein:
when each individual microwave antenna is activated, a transmission of microwaves with different polarization is performed simultaneously or in a temporal sequence; and
receiving of the microwaves is performed selectively according to polarization.

3. The method as recited in claim 1, wherein:
upon activation, the microwave antennas transmit vertically and horizontally polarized microwaves and the microwave antennas detect microwaves selectively according to the vertical and the horizontal polarization.

4. The method as recited in claim 3, wherein the microwave signals are stored so that:
two microwave signals are stored for each activation of a microwave antenna for transmitting horizontally polarized microwaves with one microwave signal being recorded in a horizontally polarized detection mode and a second microwave signal being recorded in a vertically polarized detection mode of the microwave antenna; and
two microwave signals are stored for each activation of a microwave antenna for transmitting vertically polarized microwaves, with one microwave signal being recorded in a horizontally polarized detection mode and a second microwave signal being recorded in a vertically polarized detection mode of the microwave antenna.

5. The method as recited in claim 3, wherein:
the transmitted microwaves are frequency modulated.

6. The method as recited in claim 1, wherein:
before the microwave signals are stored, each microwave signal to be stored is mixed with a transmission signal that activates an associated microwave antenna.

7. The method as recited in claim 6, wherein:
the signal mixing is performed by a summing signals.

8. The method as recited in claim 1, wherein:
the microwaves are frequency modulated at frequencies from 10 to 200 GHz.

9. The method as recited in claim 1, wherein:
a spatial zone that is detectable by the microwave antennas is divided into a plurality of unit spatial zones comprising voxels and m values are stored for each voxel with each voxel corresponding to spatial distance between said each voxel and the m microwave antenna.

10. The method as recited in claim 9, wherein:
the microwave signals are frequency modulated and are used to determine a path of the microwaves from a microwave antenna to the voxel.

11. The method as recited in claim 9, wherein:
the m values are stored in look-up tables that serve as a basis for the analysis and reconstruction of the at least one object.

12. The method as recited in claim 9, wherein:
all stored values of fractions of microwave signals that are assignable to the voxel are added together.

13. The method as recited in claim 12, wherein:
the analysis of the stored microwave signals is performed by parallel computing processes to produce a realtime reconstruction of the at least one object to be detected.

14. The method as recited in claim 1, wherein:
the reconstruction algorithm is applied to stored microwave signals by synthetic focussing on one specified voxel.

15. The method as recited in claim 1, wherein:
the at least one object to be detected is moved relative to the microwave antenna units during method steps a) to f).

16. A device for spatially resolved object detection and reconstruction of at least one objects with microwaves, including a plurality n of microwave antennas for generating microwaves that are directed at the at least one object to be detected for detecting microwave fractions reflected by the at least one object and, for converting the microwave fractions into signals that can be analyzed, and including an analyzer in which the microwave signals are analyzed, comprising:
n microwave antennas disposed in a spatial pattern about the at least one object to be detected with each microwave antenna being spaced apart by a distance from an adjacent microwave antenna that is greater than the wavelength of the microwaves and at least 10 cm, with microwaves with frequencies between 10 and 200 GHz being transmitted and received via the microwave antennas;
each microwave antenna including two transmit/receive antennas which respectively have a different polarization;
a control for controlling a temporal sequence of activation of the n microwave antennas with a HF generator connected to the n microwave antenna units to provide HF power; and wherein
the analyzer includes means, connected to the n microwave antennas for storing the microwave signals, a reconstruction module, and an output, the reconstruction module defines a reconstruction zone in which the at least one object to be reconstructed contains a plurality of voxels, distances from each antenna to each voxel are calculated and stored and after all microwave antennas have been activated, the reconstruction module performs a reconstruction of the at least one object with a reconstruction algorithm utilizing the plurality of voxels during processing of the stored microwave signals and the stored distances.

17. The device as recited in claim 16, wherein:
the two transmit/receive antennas of each microwave antenna have an antenna for transmitting and receiving horizontally polarized microwaves, and an antenna for transmitting and receiving vertically polarized microwaves.

18. The device as recited in claim 16, wherein:
the spatial arrangement of the n microwave antennas has equal distances between adjacent microwave antennas.

19. The device as recited in claim 16, wherein:
two adjacent microwave antennas units are separated by a distance greater than the wavelength of the microwaves.

20. The device as recited claim 16, comprising:
a mixing unit connected to HF generator and to the antenna and the analyzer.

21. The device as recited in claim 16, wherein:
the reconstruction module provides parallel computing and includes look-up tables for storing information of distances from specifiable spatial points of the individual microwave antennas in a spatial zone to be detected.

22. The device as recited in 16, wherein:
the output provides visualization.

* * * * *